United States Patent
Yoshida et al.

[11] Patent Number: 6,040,086
[45] Date of Patent: Mar. 21, 2000

[54] NONAQUEOUS ELECTROLYTE SECONDARY BATTERY

[75] Inventors: Hiroaki Yoshida; Zenzo Hagiwara; Masanao Terasaki, all of Kyoto, Japan

[73] Assignee: Japan Storage Battery Co., Ltd., Kyoto, Japan

[21] Appl. No.: 09/048,785

[22] Filed: Mar. 27, 1998

[51] Int. Cl.$^7$ .................. H01M 2/26; H01M 10/04
[52] U.S. Cl. .................. 429/211; 429/94; 429/161; 429/233
[58] Field of Search ................. 429/211, 233, 429/94, 245, 161

[56] References Cited

U.S. PATENT DOCUMENTS

| | | |
|---|---|---|
| 3,732,124 | 5/1973 | Cailley . |
| 3,960,603 | 6/1976 | Morioka . |
| 4,554,227 | 11/1985 | Takagaki . |

FOREIGN PATENT DOCUMENTS

| | | | |
|---|---|---|---|
| 0 357 399 | 3/1990 | European Pat. Off. ......... | H01M 6/18 |
| 2 097 301 | 2/1972 | France ........................... | H01M 13/00 |
| 2 146 167 | 4/1985 | United Kingdom ............ | H01M 2/26 |

OTHER PUBLICATIONS

Patent Abstracts of Japan vol. 007, No. 229, (E–203), Oct. 12, 1983 & JP 58 119154 A (Yuasa Denchi KK) Jul. 15, 1993 *Abstract.

Database WPI Section Ch, Week 9827 Derwent Publications Ltd., London, GB; Class L03, AN 98–303151 XP002071780 & JP 10 106 536 A (Japan Storage Battery Co Ltd) *Abstract, Apr. 1998.

*Primary Examiner*—John S. Maples
*Attorney, Agent, or Firm*—Sughrue, Mion, Zinn, Macpeak & Seas, PLLC

[57] ABSTRACT

A nonaqueous electrolyte secondary battery according to the present invention has a power-generating element and a collector. The power-generating element is provided with a portion where a negative electrode plate and a positive electrode plate are not opposed to each other. In the power-generating element, the electrode plates are wound or laminated through a separation body so that the side edge portion of one of the electrode plates protrudes from that of the other. The collector is connected to the side edge portions. The collector has a plurality of grooves bonded to the side edges of the electrode plates. The bonding is made by at least one of a welding method such as ultrasonic welding method, laser welding method, electric welding method, arc welding method and plasma arc welding method, and a mechanical joint using a rivet, pin or eyelet, or by deforming under pressure the collector to crimp.

7 Claims, 13 Drawing Sheets

SECTIONAL VIEW TAKEN ON LINE A-A'

SECTIONAL VIEW TAKEN ON LINE A-A'

NONAQUEOUS ELECTROLYTE SECONDARY BATTERY

BACKGROUND OF THE INVENTION

1. Field of the Invention

The present invention relates to a nonaqueous electrolyte secondary battery which exhibits a high rate dischargeability as a driving power supply for electronic apparatuses or a battery for electric vehicles.

2. Description of the Related Art

A nonaqueous electrolyte secondary battery for an apparatus which requires a high rate dischargeability such as motor-driven apparatus, portable electronic apparatus and electric car comprises an electrolyte having a drastically higher resistivity than that of an aqueous electrolyte. Thus it needs to have an increased electrode plate area and an increased opposing area of the electrode plate. To this end, the electrode plate comprises as a substrate a metal foil having a thickness of from 5 to 50 $\mu$m and a positive or negative active electrode material applied thereto. As the power-generating element to be incorporated in the battery, there is used one assembled by winding or laminating thin belt-like positive electrodes or negative electrodes with a separator provided interposed therebetween.

The provision of a current-collecting arrangement in a power-generating element has heretofore been accomplished by connecting a collector terminal 2 to an electrode plate at a portion 4 (uncoated portion 4) which is not coated with an active material so that the substrate of the electrode plate is exposed as shown in FIG. 1. However, a battery for electric vehicle or the like must exhibit a high rate dischargeability and thus needs to have a reduced internal resistivity and a uniformalized current distribution. To this end, as shown in FIG. 2, the provision of a current-collecting arrangement in a power-generating element has been accomplished by connecting a plurality of terminals 2 to an electrode plate at an uncoated portion 4 on a longitudinal side edge thereof (multi-terminal collector system).

A nonaqueous electrolyte secondary battery which must exhibit a high rate dischargeability requires a large number of current-collecting terminals. For example, a battery of 100 to 400 Wh class, if structured in a multi-terminal collector system, requires from 10 to 50 terminals and thus faces a great disadvantage that it can be produced at only a reduced efficiency.

SUMMARY OF THE INVENTION

It is an object of the present invention to provide a nonaqueous electrolyte secondary battery in which a highly reliable connection of a power-generating element to a collector in a nonaqueous electrolyte secondary battery can be produced in a short period of time.

A nonaqueous electrolyte secondary battery comprising:

a power-generating element having a positive electrode, a negative electrode and a separation body, the power-generating element being provided with a portion where the negative electrode plate and the positive electrode plate are not opposed to each other, the positive and negative electrodes being wound or laminated through the separation body so that the side edge portion of one of the electrode plates protrudes from that of the other; and a collector connected to the side edge portion, the collector having a plurality of grooves bonded to the side edges of the negative and positive electrode plates; wherein the bonding is made by at least one of a welding method and a mechanical joint.

The proper consideration of the welding method, the shape of the collector and the shape of the side edge of the power-generating element makes it possible to provide a nonaqueous electrolyte secondary battery comprising a collector structure having a high reliability which can be easily produced.

DETAILED DESCRIPTION OF THE INVENTION

Detailed description of the present invention will be described as follows referring to the accompanying drawings.

A nonaqueous electrolyte secondary battery according to the present invention has a power-generating element and a collector. The power-generating element is provided with a portion where a negative electrode plate and a positive electrode plate are not opposed to each other. In the power-generating element, the electrode plates are wound or laminated through a separation body so that the side edge portion of one of the electrode plates protrudes from that of the other. The collector is connected to the side edge portions.

The collector has a plurality of grooves bonded to the side edges of the electrode plates. The bonding is made by at least one of a welding method such as ultrasonic welding method, laser welding method, electric welding method, arc welding method and plasma arc welding method, and a mechanical joint using a rivet, pin or eyelet, or by deforming under pressure the collector to crimp.

In the nonaqueous electrolyte secondary battery as defined above, the collector preferably has a guide portion through which the side edge of electrode plates bundled into a single or a plurality of groups are introduced into said grooves when said collectors are attached to said electrode plates.

In the nonaqueous electrolyte secondary battery as defined above, the collector is formed by a plate material having a thickness of from 0.1 to 2 mm.

The foregoing arrangements may be combined.

The term "separation body" as used herein is meant to indicate "separator", "organic solid electrolyte (e.g., PAN, PEO), "inorganic solid electrolyte" or the like.

The present invention will be further described in the following examples in connection with the accompanying drawings.

EXAMPLE 1

0.5 mols of lithium carbonate and 1 mol of cobalt carbonate as active positive electrode materials were mixed, and then sintered at a temperature of 900° C. in the air to obtain $LiCoO_2$. 91% by weight of $LiCoO_2$, 6% by weight of graphite as an electrically conducting agent, and 3% by weight of a polyvinylidene fluoride (PVDF) as a binder were mixed to obtain a positive electrode compound. To the positive electrode compound thus obtained was then added N-methyl-2-pyrrolidone as a solvent. The mixture was then subjected to dispersion in admixture to obtain a slurry.

A belt-like aluminum foil having a thickness of 20 $\mu$m was prepared as an electrode plate substrate. The foregoing positive electrode compound slurry was uniformly applied to the substrate, and then dried. The coated material was then passed under a rolling press machine to adjust its thickness to 230 $\mu$m to prepare a belt-like positive electrode plate having a length of 9,965 mm and a width of 171 mm.

Figure 1:
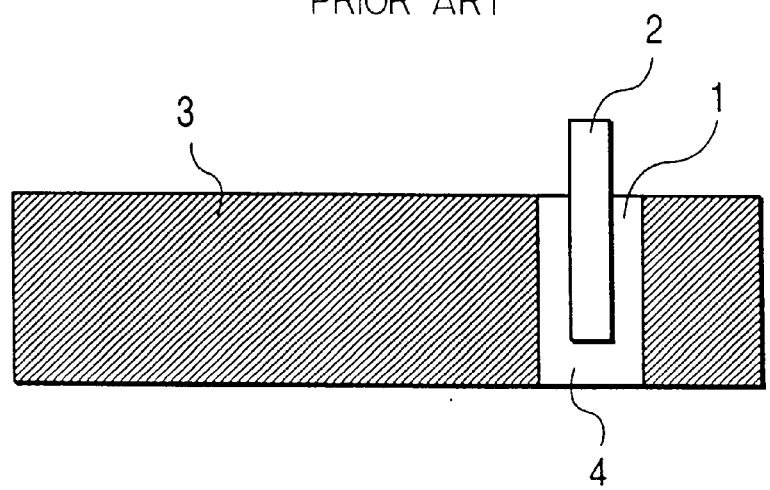
FIG. 1 is a plan view illustrating a conventional electrode plate.
Figure 2:
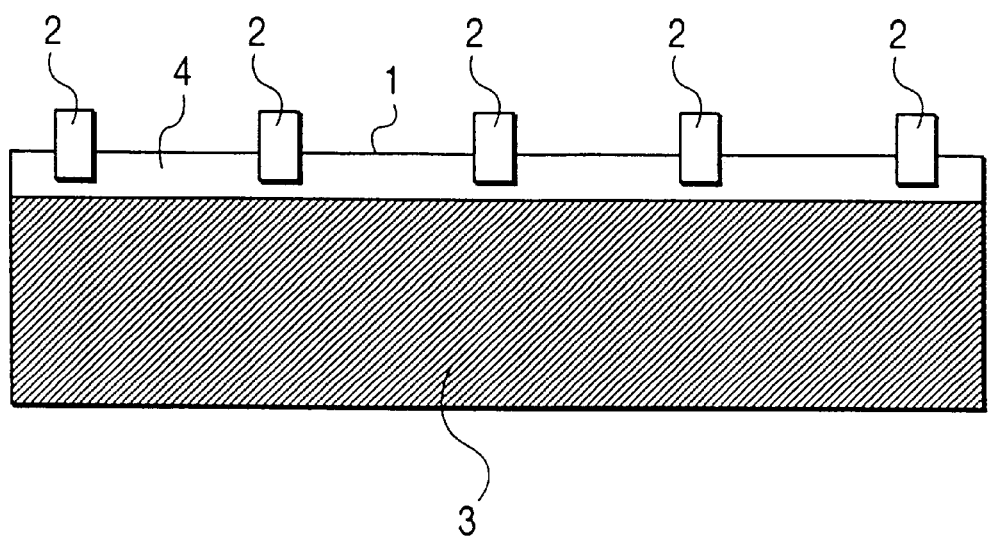
FIG. 2 is a plan view illustrating an electrode plate using a conventional multi-terminal collection system.
Figure 3:
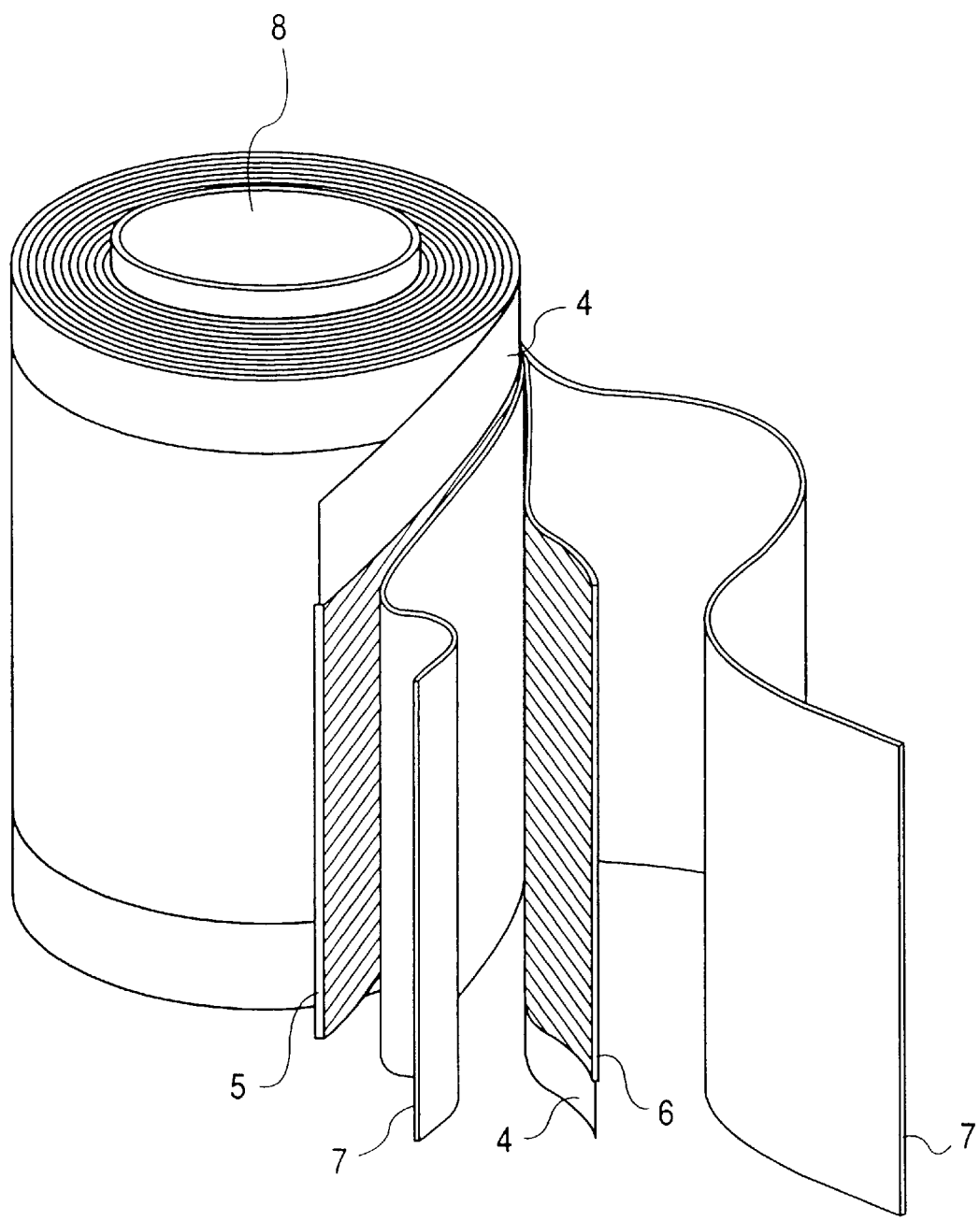
FIG. 3 is an exploded perspective view illustrating a power-generating element in a nonaqueous electrolyte secondary battery according to an embodiment of the present invention.

The electrode plate has an unapplied portion 4 having a width of 10 mm provided at a longitudinal side edge thereof which is not coated with a host material capable of occluding or releasing an active material or lithium ion as shown in FIG. 3.

For the negative electrode, a carbon material (graphite) powder which can be doped with lithium or release lithium was used. 90% by weight of graphite powder and 10% by weight of PVDF as a binder were mixed to obtain a negative A-5 electrode compound. To the negative electrode compound thus obtained was then added N-methyl-2-pyrrolidone as a solvent. The mixture was then kneaded to obtain a slurry. A belt-like copper foil having a thickness of 20 gm was prepared as an electrode plate substrate. The foregoing negative electrode compound slurry was applied to the substrate, and then dried. The coated material was then passed under a rolling press machine to adjust its thickness to 200 $\mu$m to prepare a negative electrode plate having a length of 9,900 mm and a width of 172 mm. The electrode plate has an uncoated portion having a width of 10 mm at a longitudinal side edge thereof similarly to the positive electrode plate.

The positive and negative electrode plates thus prepared were then spirally wound with a separator 7 made of a microporous polyethylene film provided interposed therebetween and a core 8 made of a polyethylene terephthalate pipe provided at the center of the spiral in such an arrangement that the side edge (uncoated portion 4) of one of the electrode plates protrudes from the side edge of the other as shown in FIG. 3 to obtain a cylindrical power-generating element. In FIG. 3, the reference numeral 5 indicates a positive electrode plate, and the reference numeral 6 indicates a negative electrode plate.

Figure 4:
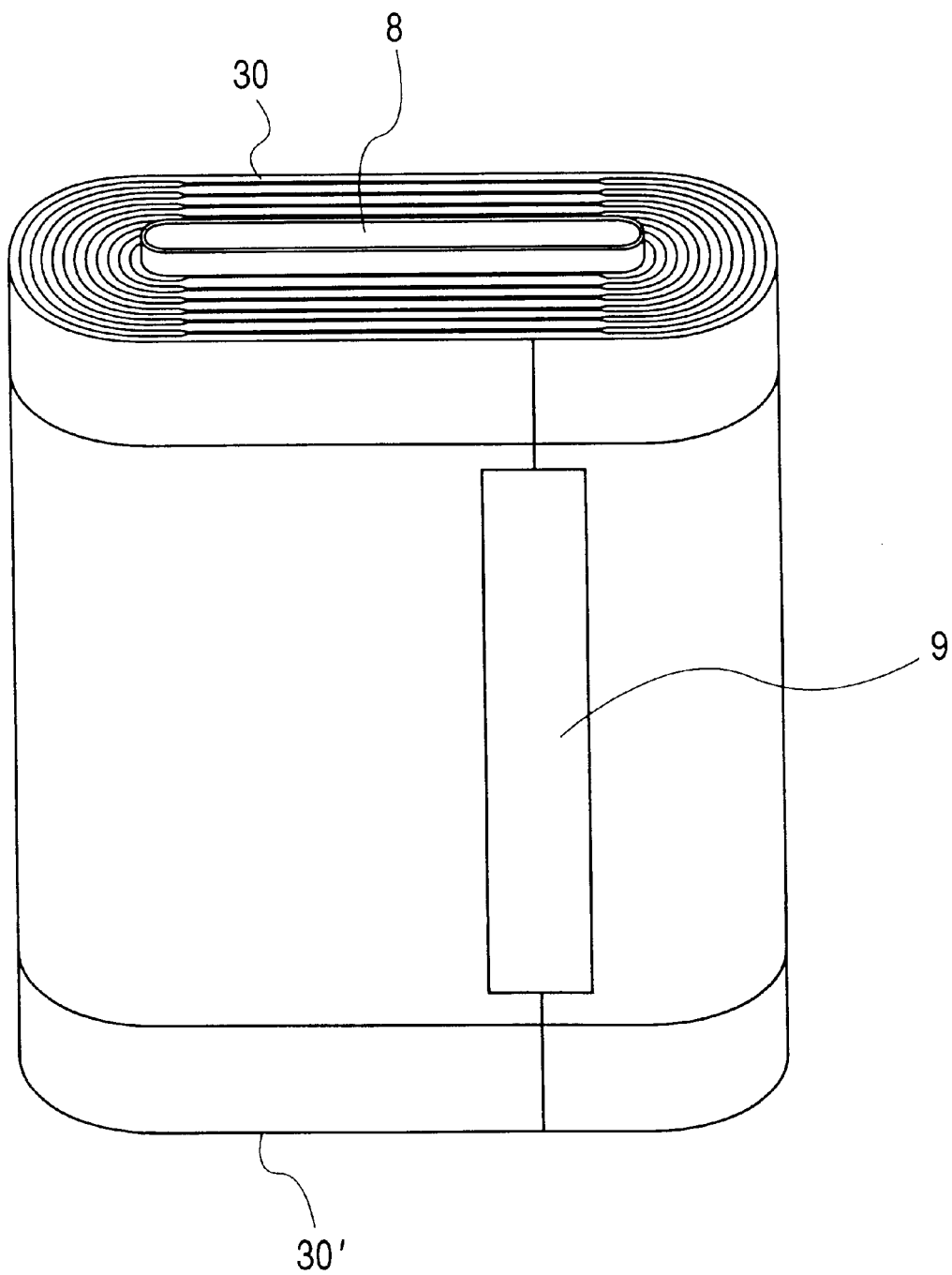
FIG. 4 is a perspective view illustrating a power-generating element in a nonaqueous electrolyte secondary battery according to an embodiment of the present invention.
Figure 5:
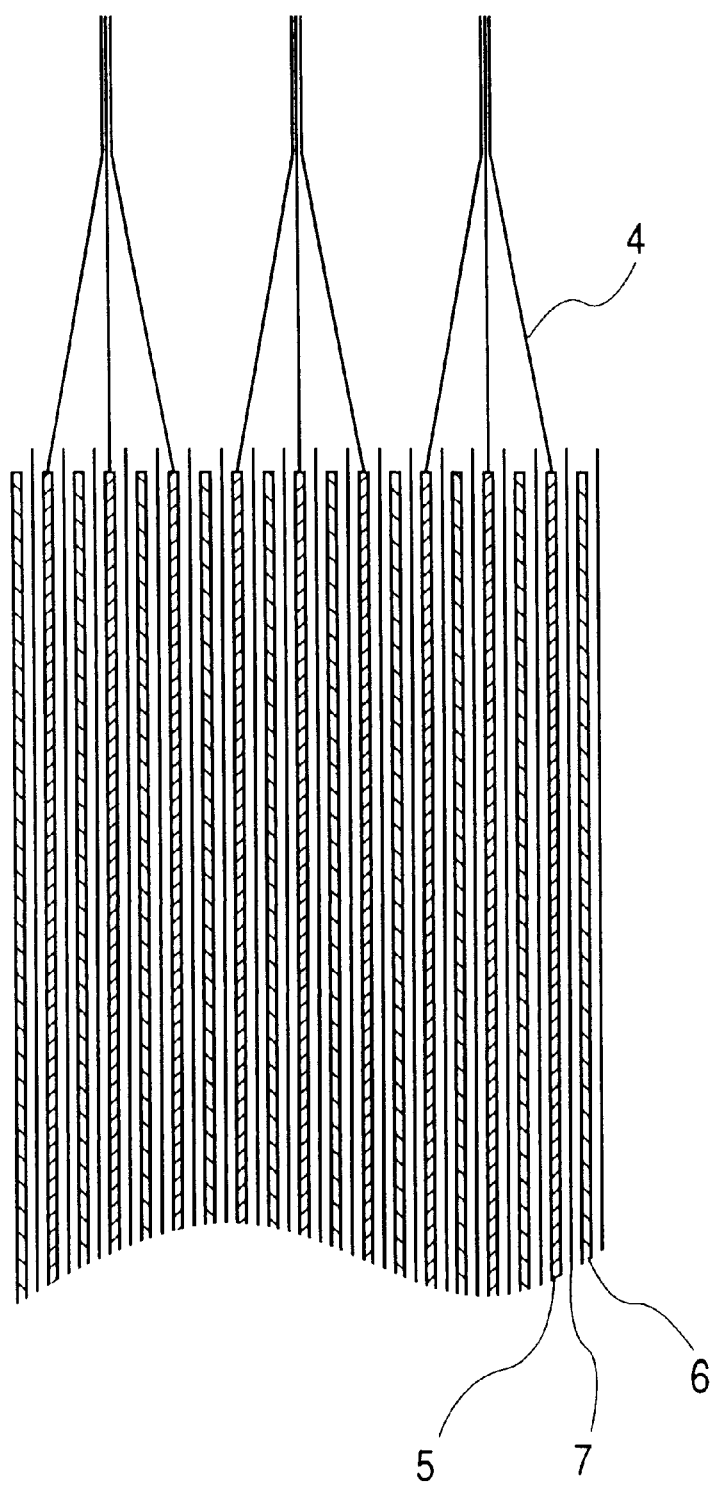
FIG. 5 is an enlarged vertical sectional view of an essential part of (a power-generating element which has been bent at the side edge of the electrode by means of a fixture) in accordance with the present invention.

Subsequently, the periphery of the cylindrical power-generating element was fixed with a tape. The cylindrical power-generating element was pressed to form a power-generating element having an ellipsoidal section as shown in FIG. 4. The reference numeral 9 indicates a fixing tape. The linear portions 30, 30' of the side edges of the power-generating element were then bent by means of a fixture so that they are bound into bundles each having a predetermined number of side edges as shown in FIG. 5.

Figure 6:
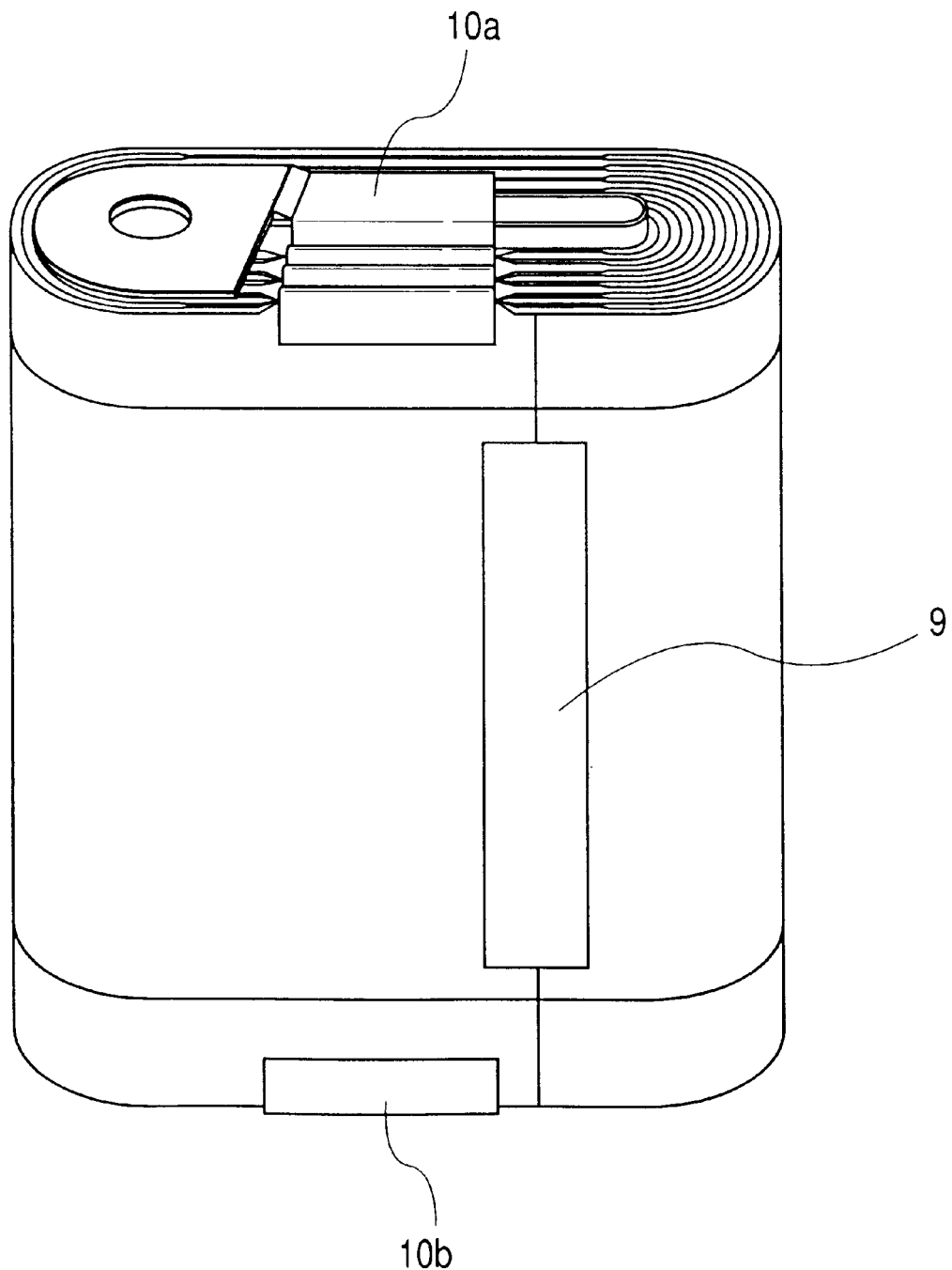
FIG. 6 is a perspective view illustrating a power-generating element comprising a collector of Example 1 of the present invention mounted therein.
Figure 7:
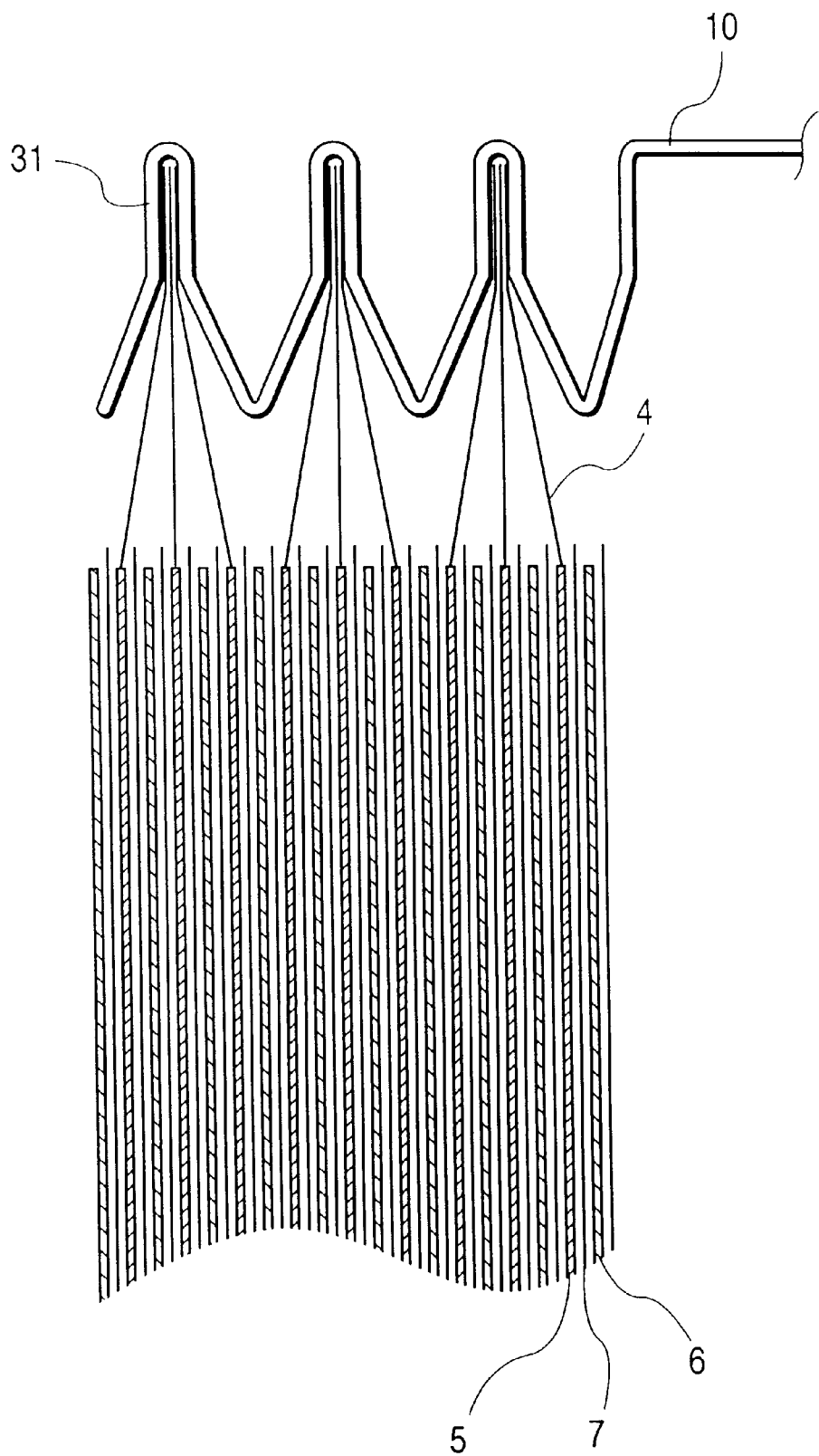
FIG. 7 is an enlarged vertical sectional view of an essential part of the collector of Example 1 of the present invention mounted therein.

Collectors 10a, 10b of the same material as the electrode plate substrate having a thickness of 1.5 mm as shown in FIG. 6 were then applied to these upper and lower bundles, respectively, in such an arrangement that the side edge of the power-generating element is inserted into the inverted U-shaped groove 31 in the collectors as shown in FIG. 7. The lamination of the collector and the electrode plate was then subjected to ultrasonic welding at an area of 2 mm×25 mm as shown in FIG. 8. The reference numeral 11 indicates a welding fixture.

The ultrasonic welding was effected by means of a Type 19000 ultrasonic welder available from Amtech Inc. The ultrasonic welding of the positive electrode substrate (aluminum foil) to the collector (aluminum) was effected at an output of 2,500 W and a frequency of 20 KHz under a load of 300 kg for an oscillation time of 1 second. The ultrasonic welding of the negative electrode substrate (copper foil) to the collector (copper) was effected at an output of 3,000 W and a frequency of 20 KHz for an oscillation time of 2 seconds.

Figure 8A:
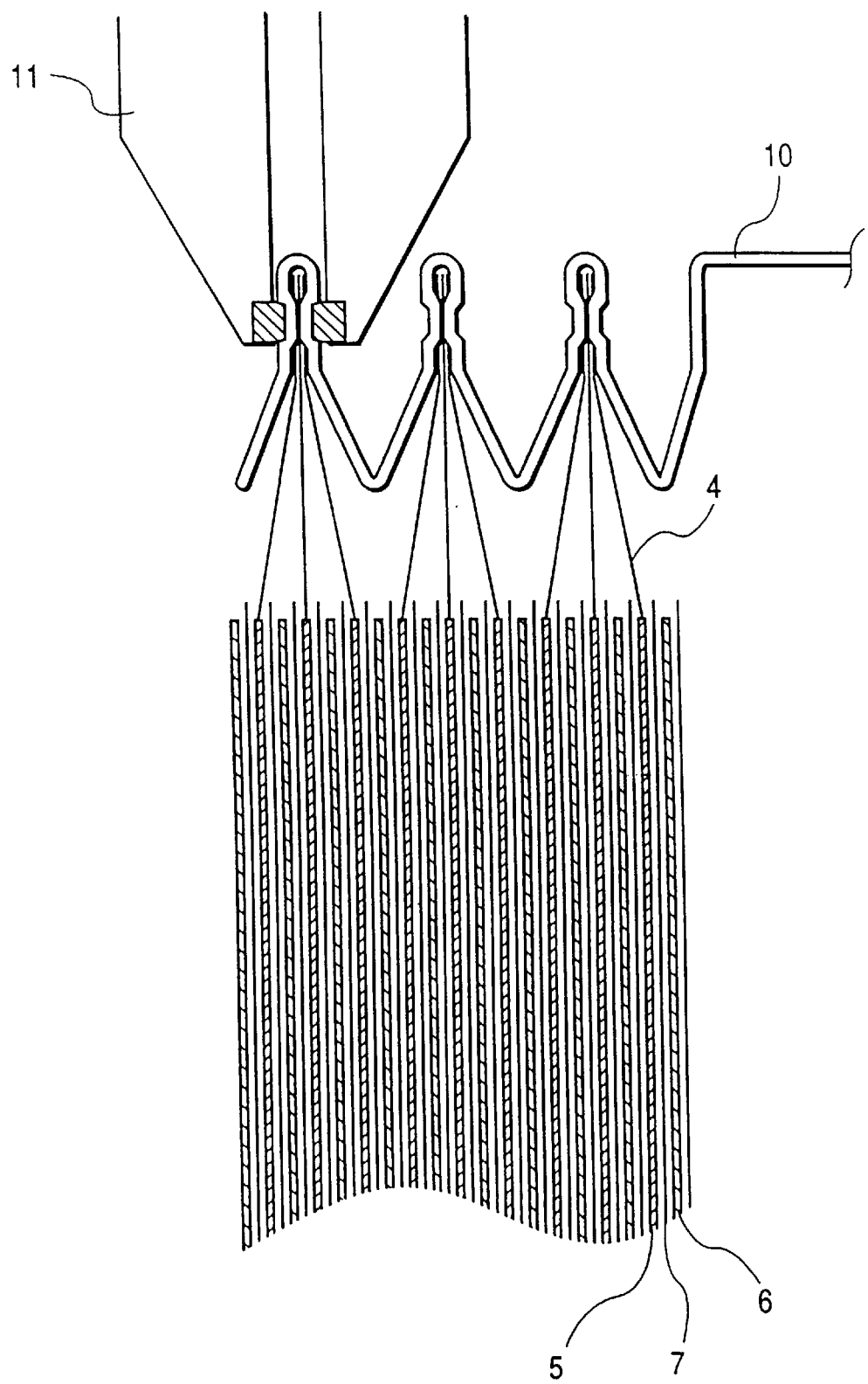
FIG. 8A is an enlarged vertical sectional view of the welded portion of the essential part of the collector of Example 1 of the present invention mounted therein.
Figure 8B:
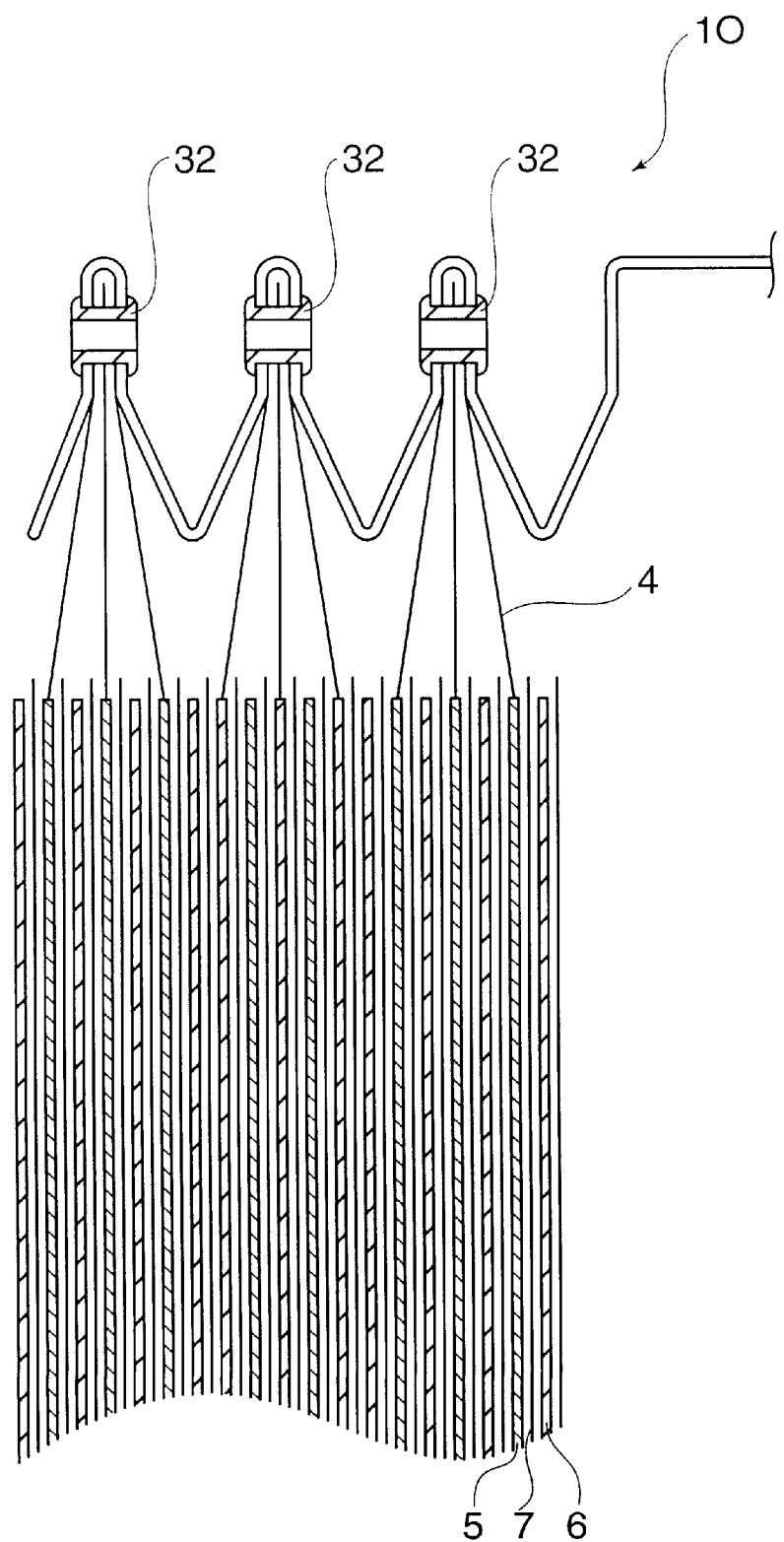
FIGS. 8B–8D are enlarged vertical sectional views of the essential part of the collector bonded by means of mechanical joints. The mechanical joints shown in FIGS. 8B–8D are an eyelet, pin and revet, respectively.
Figure 8C:
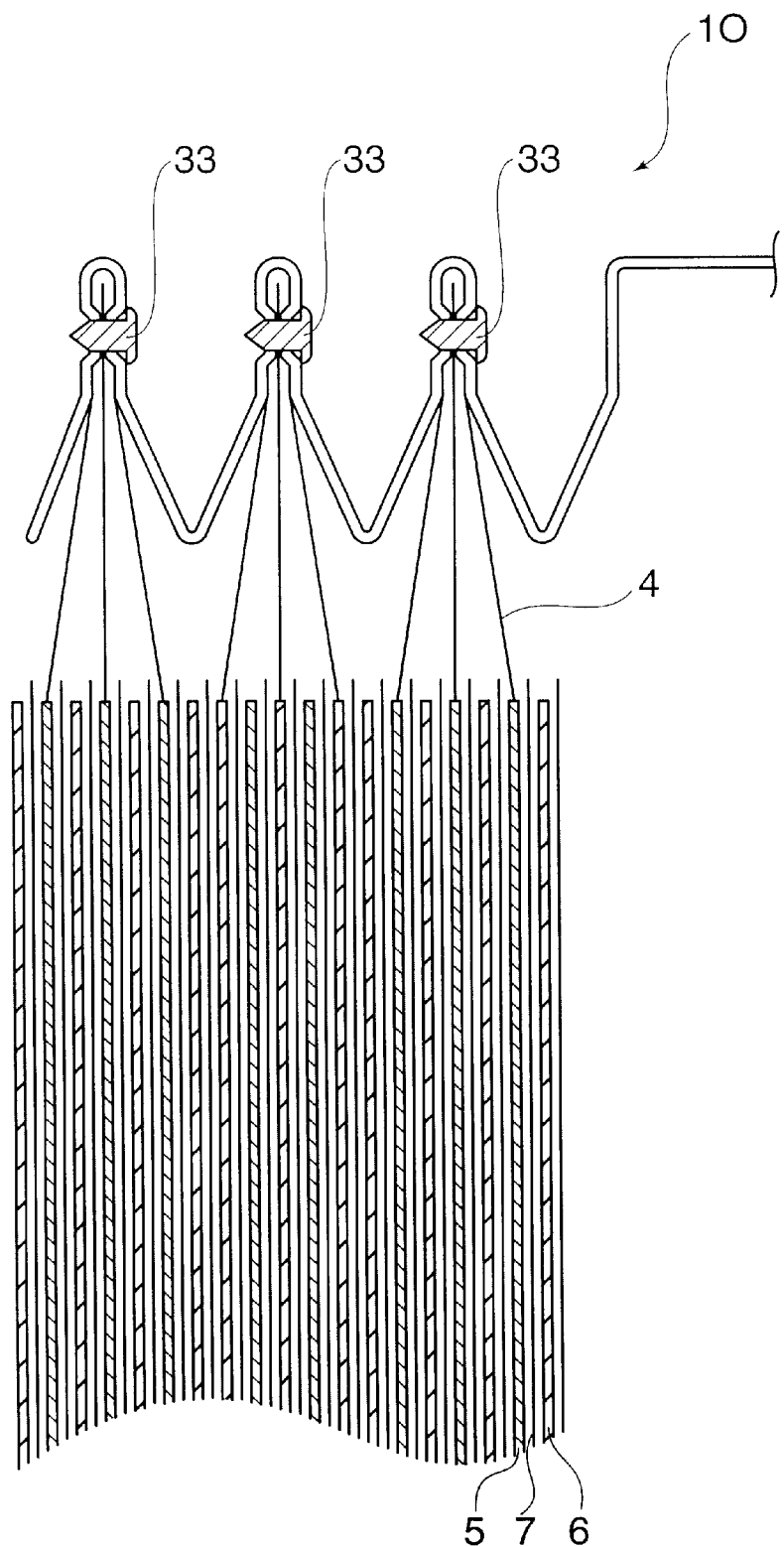
Figure 8D:
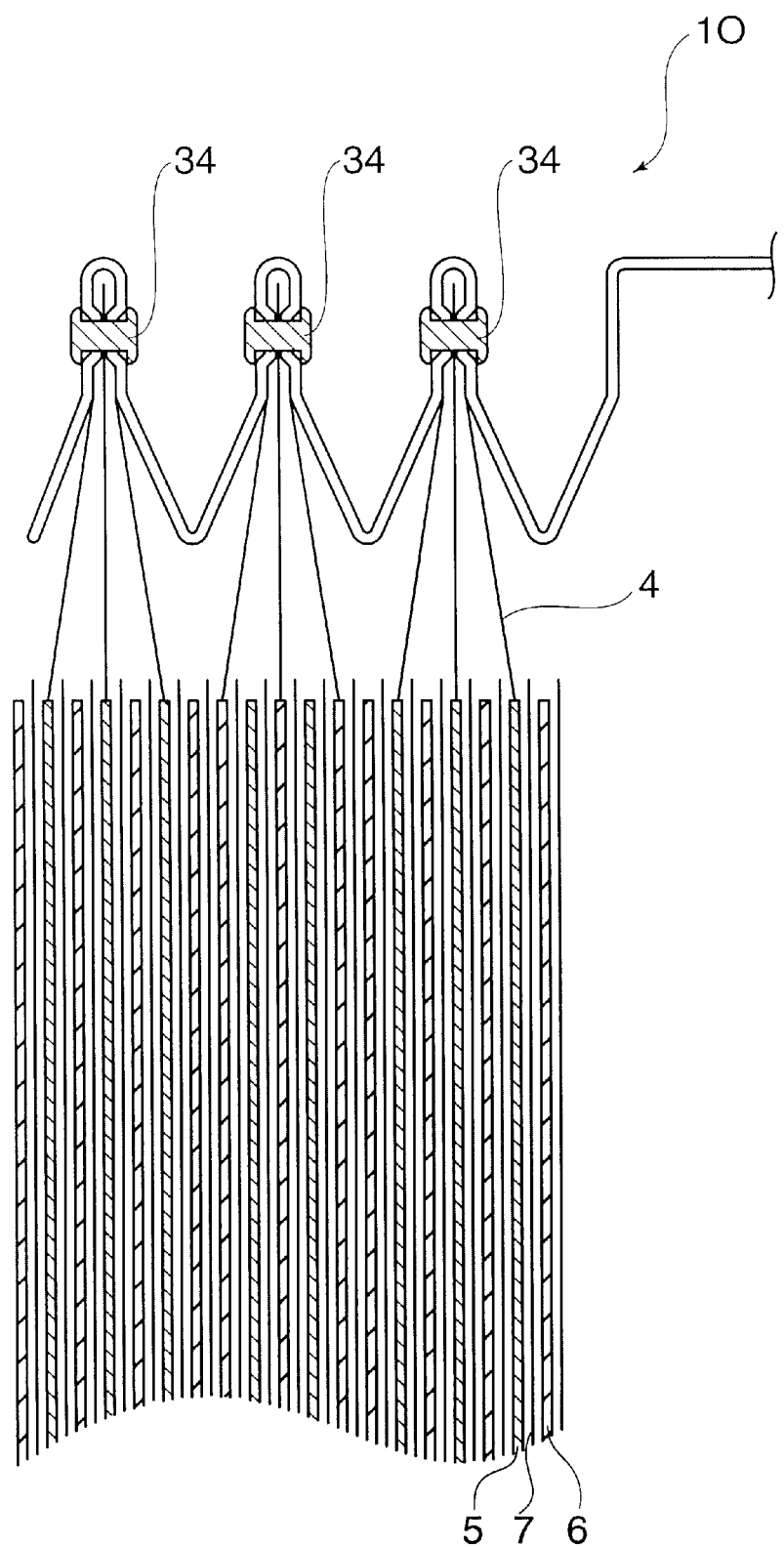

Alternatively, the grooves of the connector may be joined as described above and bonded by means of a mechanical joint. FIG. 8B shows an example wherein such a mechanical joint is an eyelet 32. FIG. 8C shows an example wherein such a mechanical joint is a pin 33. FIG. 8D shows an example wherein such a mechanical joint is a revet 34.

Figure 11:
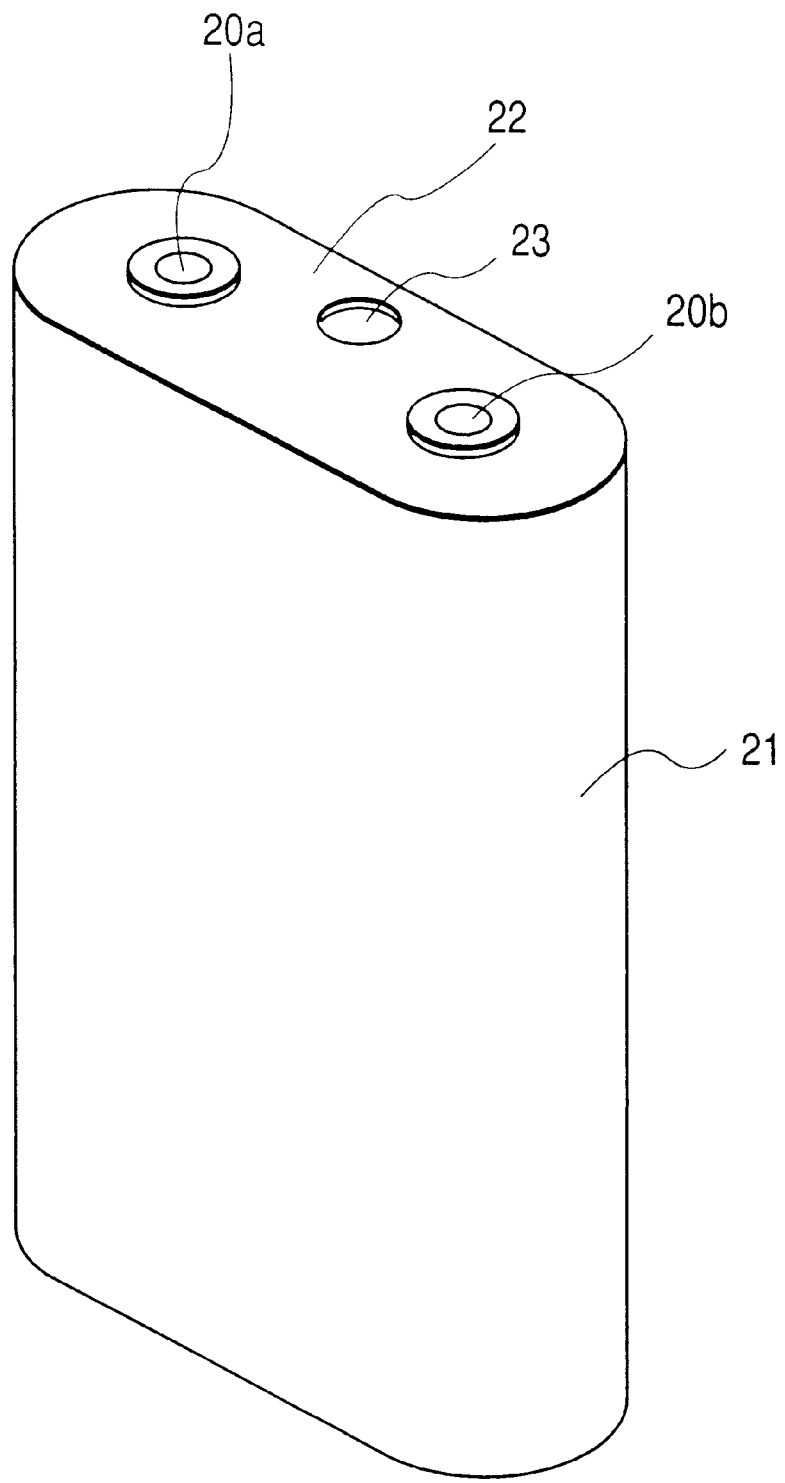
FIG. 11 is an exterior view illustrating a nonaqueous electrolyte secondary battery according to the present invention.

The power-generating element thus prepared was inserted into an ellipsoidal container (50 mm width×130 mm length× 210 mm height) which was then sealed. The external appearance of the battery is shown in FIG. 11. The reference numeral 21 indicates a battery container, the reference numeral 22 indicates a lid, and the reference numeral 23 indicates a fluid inlet port provided in the lid. During this step, the positive electrode collector 10a and the negative electrode collector 10b were connected to a positive electrode terminal 20a and a negative electrode terminal 20b provided on the battery lid 22, respectively, inside the container (not shown).

Subsequently, an electrolytic solution obtained by dissolving 1 mol/l of lithium hexafluoro phosphate ($LiPF_6$) in a 1:1 (by volume) mixture of ethylene carbonate and dimethyl carbonate was injected into the battery container through the fluid inlet port 23. The capacity of the battery thus prepared was 100 Ah.

COMPARATIVE EXAMPLE

As a comparative example, a conventional battery was prepared in the following manner.

Figure 9:
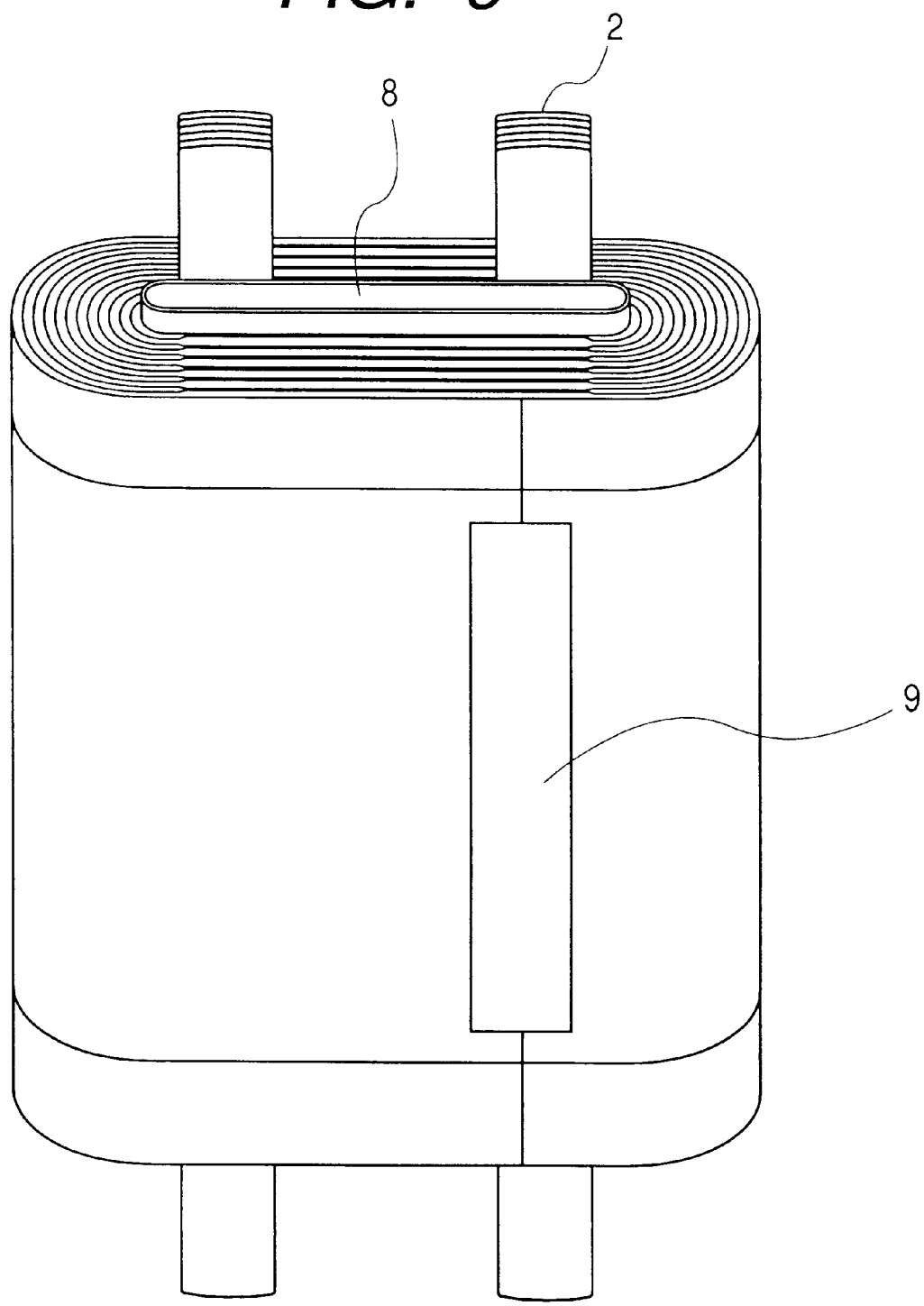
FIG. 9 is a perspective view illustrating a power-generating element in a nonaqueous electrolyte secondary battery using a conventional multi-terminal collection system.

A positive electrode 5 and a negative electrode 6 were prepared in the same manner as in Example 1 of the present invention. The positive electrode 5 and the negative electrode 6 were arranged such that the side edge (uncoated portion 4) of the positive electrode 5 and the negative electrode 6 are positioned at the opposite sides, respectively, and then spirally wound with a separator 7 made of a microporous polyethylene film provided interposed therebetween and a core 8 made of a polyethylene terephthalate pipe provided at the center of the spiral. During this step, positioning was effected. 50 terminals 2 were ultrasonically welded to the positive electrode and the negative electrode, respectively. In some detail, each time the electrodes were wound by several turns, the rotation of the core was suspended, and a terminal 2 was welded to the electrodes. The electrodes were then wound until the subsequent terminal position was reached. This procedure was then repeated until 50 terminals were welded to the positive electrode and the negative electrode, respectively. The periphery of the coil thus wound was the fixed with a tape 9. The coil was then pressed to form a power-generating element having an ellipsoidal section (see FIG. 9).

The power-generating element thus prepared was inserted into the same ellipsoidal battery case as used in the example of the present invention which was then sealed. The terminals 2 on the positive electrode and the negative electrode were connected to a positive electrode terminal and a negative electrode terminal provided on the battery container, respectively. An electrolytic solution was then injected into the battery container in the same manner as in the battery of the present invention. The capacity of the comparative battery thus prepared, too, was 100 Ah.

Comparison 100 pieces of the foregoing two types of batteries were prepared. The results of comparison of the time required from the time at which the electrode is formed until the power-generating element is inserted into the battery container (averaged over 100 pieces) are set forth in Table 1.

TABLE 1

| Example No. | Winding (sec.) | Pressing (sec.) | Welding (sec.) | Total (sec.) |
|---|---|---|---|---|
| Example 1 | 30 | 10 | 20 | 60 |
| Comparative Example | 600 | 10 | 0 | 610 |

Note: The time required for Comparative Example to be wound includes welding time.

The results show that the nonaqueous electrolyte secondary battery having the collector structure of the present invention can be produced at a reduced tact, making it possible to enhance the productivity.

In the example, an ellipsoidally wound power-generating element was used, but the shape of the power-generating element is not limited thereto. For example, the power-generating element may be cylindrical. Further, the shape of the collector 10 is not limited to that of the example of the present invention. A shape suitable for the side edge of the electrode may be used. For example, if the power-generating element is cylindrical, a collector having a shape corresponding to the curvature of the cylinder may be used. If the electrodes are laminated, the same shape as used in Example 1 of the present invention may be used.

Figure 10A:
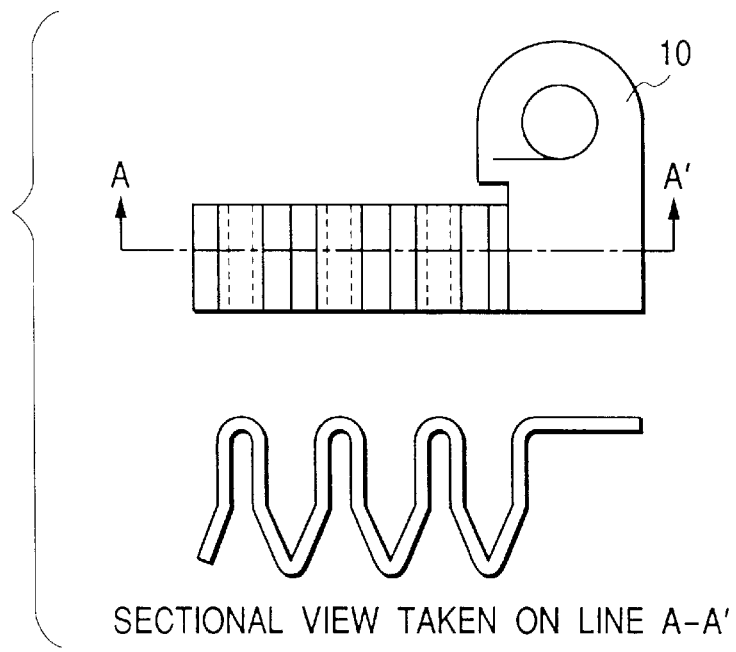
FIG. 10A is a plan and sectional view illustrating a collector of Example 1.
Figure 10B:
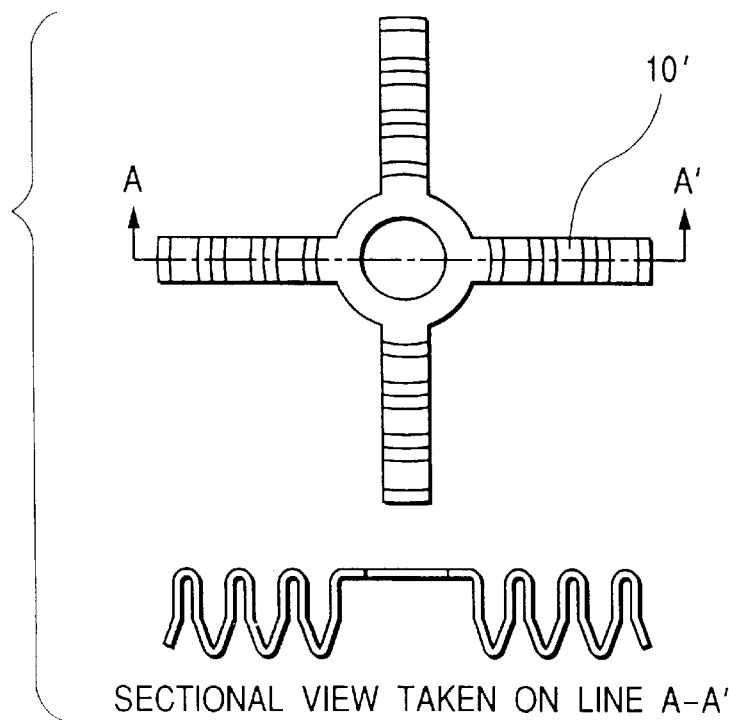
FIG. 10B is a plan and sectional view illustrating a collector for a cylindrical battery.

FIG. 10A shows a plan view and a sectional view of the collector 10 used in Example 1. FIG. 10B shows a plan view and a sectional view of the collector 10' used in a cylindrical power-generating element.

The connection of the collector to the side edge of the electrode can be accomplished by the ultrasonic welding method as described in the example of the present invention as well as other known various connecting methods. The employment of an electrical resistance welding method makes it possible to carry out the procedure described in the example of the present invention without any significant modification. If arc welding method, plasma arc welding method or laser welding method is employed, attention should be given to excessive temperature rise. However, if a heat sink is used, these welding methods may be applied to the present invention. Besides these welding methods, any mechanical connecting methods may be used so far as sufficient electrical contact can be made. For example, the collector and the side edge of the electrode can be mechanically and electrically connected to each other by a mechanical caulking contact-bonding method using a rivet, pin, eyelet or the like. Alternatively, the collector and the side edge of the electrode from which current can be collected may be connected to each other by a mechanical caulking contact-bonding method involving the integrated deformation by pressing.

The example of the present invention has been described with reference to the case where a collector is prepared by press-forming a plate material having a thickness of 1.5 mm, but the present invention is not limited thereto. If the thickness of the plate material falls within the range of from 0.1 mm to 2 mm, results similar to that of the example of the present invention can be obtained. The press forming of the plate material can be accomplished merely by providing slits in the plate material, and then corrugating the plate material. The shape of the collector thus formed is most appropriate for the present invention.

If the plate material to be used has a thickness of not more than 0.1 mm, it exhibits too small a strength to maintain the desired shape of the collector, making it difficult to pass through a mass production machine. On the contrary, if the plate material to be used has a thickness of not less than 2 mm, it exhibits too great a strength to connect itself to the electrode.

The foregoing example has been described with reference to the case where aluminum and copper are used as electrode plate substrate. An aluminum-manganese alloy, an aluminum-magnesium alloy or the like may be used instead of aluminum. A copper-zinc alloy, a copper-nickel copper alloy, a copper-aluminum alloy or the like may be used instead of copper. However, pure aluminum and pure copper can be more easily connected to the electrode than these alloys.

It is essentially preferred that as the material of the collector there be used the same material as that of the electrode plate substrate. However, the material of the collector may be an alloy different from the electrode plate substrate for the reason of workability or the like.

The example of the present invention has been described with reference to the case where the portion on the electrode plate which is not coated with an active material is 10 mm, but the present invention is not specifically limited thereto so far as the separator and the active material compound cannot be adversely affected in the various connecting methods. The greater the width of the uncoated portion is, the more easily can be collected current, but the lower is the energy density of the battery. Therefore, the width of the uncoated portion is normally from 2 mm to 50 mm, preferably from 3 mm to 30 mm, taking into account practicality.

As the active positive electrode material there may be used a known active material such as lithium-nickel composite im oxide, spinnel type lithium-manganese oxide, vanadium pentoxide and titanium disulfide besides those used in the example of the present invention. As the active negative electrode material there may be used a low crystallinity carbon material, an amorphous carbon material, a metal oxide or the like besides graphite powder used in the example of the present invention.

The present invention can be applied to secondary lithium battery as well as other various nonaqueous electrolyte secondary batteries having the same structure as secondary lithium battery, i.e., structure comprising a metal foil coated with an active material from which metal foil current is collected.

What is claimed is:

1. A nonaqueous electrolyte secondary battery comprising:
   a power-generating element having a positive electrode, a negative electrode and a separation body, said power-generating element being provided with a portion where said negative electrode and said positive electrode are not opposed to each other, said positive and negative electrodes being wound or laminated through said separation body so that side edge portions of each of said electrode plates protrude from that of the other; and
   a collector connected to the side edge portion, said collector having a plurality of grooves bonded to the side edge portions of said negative and positive electrode plates, wherein
   said collector has a guide portion through which bundled groups of said side edge portions are introduced into said grooves, and further wherein
   said bonding is made by at least one of a welding method and a mechanical joint.

2. A nonaqueous electrolyte secondary battery according to claim 1, wherein said welding method is at least one of ultrasonic welding method, laser welding method, electric welding method, arc welding method and plasma arc welding method.

3. A nonaqueous electrolyte secondary battery according to claim 1, wherein said mechanical joint uses a revet, pin or eyelet.

4. A nonaqueous electrolyte secondary battery according to claim 1, wherein said mechanical joint is made by deforming under pressure the collector to crimp.

5. A nonaqueous electrolyte secondary battery according to claim 1, wherein said collector is formed by a plate material having a thickness of from 0.1 mm to 2 mm.

6. A nonaqueous electrolyte secondary battery according to claim 1, wherein each of said negative and positive electrodes has an uncoated portion where an active material is not applied, a width of said uncoated portion is in the range of 2 mm to 50 mm.

7. A nonaqueous electrolyte secondary battery according to claim 6, the width of said uncoated portion is in the range of 3 mm to 30 mm.

* * * * *

UNITED STATES PATENT AND TRADEMARK OFFICE
CERTIFICATE OF CORRECTION

PATENT NO. : 6,040,086
DATED : March 21, 2000
INVENTOR(S) : Hiroaki Yoshida, Zenzo Hagiwara, Masanao Terasaki It is certified that error appears in the above-identified patent and that said Letters Patent is hereby corrected as shown below:

Title page,
Please insert field [30] as follows:

-- [30]     Foreign Application Priority Data
   Mar. 27, 1997 [JP]    Japan ....................9-95169 --

Signed and Sealed this

Fifth Day of February, 2002

Attest:

JAMES E. ROGAN
Attesting Officer
Director of the United States Patent and Trademark Office